United States Patent [19]

de Nora et al.

[11] 4,136,235

[45] Jan. 23, 1979

[54] SECONDARY BATTERIES

[75] Inventors: Vittorio de Nora, Nassau, The Bahamas; Antonio Nidola; Placido M. Spaziante, both of Lugano, Switzerland

[73] Assignee: Diamond Shamrock Technologies S.A., Geneva, Switzerland

[21] Appl. No.: 816,748

[22] Filed: Jul. 18, 1977

Related U.S. Application Data

[63] Continuation-in-part of Ser. No. 761,315, Jan. 21, 1977, abandoned.

[51] Int. Cl.$^2$ ............................................. H01M 6/04
[52] U.S. Cl. ................................... 429/204; 429/225; 429/228; 429/245
[58] Field of Search ............... 429/163, 219, 222, 204, 429/225–228, 245; 204/290 F, 292, 293; 75/62, 97 R, 174, 175.5, 176

[56] References Cited

U.S. PATENT DOCUMENTS

| | | | |
|---|---|---|---|
| 2,872,405 | 2/1959 | Miller et al. | 204/290 F |
| 3,457,112 | 7/1969 | Reber | 429/225 X |
| 3,765,942 | 10/1973 | Jache | 429/225 X |
| 3,873,437 | 3/1975 | Pulver | 204/290 F X |
| 3,884,792 | 5/1975 | McGilvery | 204/290 F |
| 3,977,958 | 8/1976 | Caldwell et al. | 204/290 F X |

*Primary Examiner*—Charles F. Lefevour
*Attorney, Agent, or Firm*—Hammond & Littell

[57] ABSTRACT

Storage batteries having negative and positive electrodes in which oxidized lead and/or lead oxide paste for the positive electrodes is applied to a metal base selected from the group consisting of tungsten-rhenium alloys, tantalum and titanium-tantalum alloys and lead and/or oxidized lead paste for the negative electrodes is applied to a metal base selected from the group consisting of tantalum, titanium-tantalum alloys and an alloy of tungsten-rhenium provided with a thin coating of cadmium, silver or lead which avoid the defects of the known electrodes.

10 Claims, No Drawings

SECONDARY BATTERIES

PRIOR APPLICATION

This application is a continuation-in-part of our co-pending, commonly assigned application Ser. No. 761,315 filed Jan. 21, 1977, now abandoned.

STATE OF THE ART

According to a known proposal, smooth, even, very well-adhering coatings of lead dioxide on titanium surfaces, which even as thin coatings are stable to anodic polarization, are a non-polarizing material such as gold. U.S. Pat. No. 3,870,563 and No. 3,798,070 describe a lead peroxide/titanium-electrode with a gelled sulfuric acid electrolyte containing titanyl sulfate. U.S. Pat. No. 3,884,716 describes a storage battery with an aluminum substrate coated with zinc and then silver onto which lead is deposited.

The problem involved with the lead alloy base such as heaviness, poor workability and fragilness have not been overcome by the use of aluminum and titanium. Aluminum is unstable at potentials of $\leq -0.2$V (NHE) and titanium is unstable at potentials of $-0.4$ to $0.2$ volts (NHE). The coatings of these metals with an intermediate coating of silver for example is not satisfactory since the porosity of the intermediate layer still permits attack of the titanium base by the concentrated sulfuric acid.

OBJECTS OF THE INVENTION

It is an object of the invention to provide novel positive electrode grids for lead-acid batteries consisting essentially of lead oxides or oxidized lead paste and a base of tantalum, titanium-tantalum alloy or tungsten-rhenium alloy.

It is a further object of the invention to provide novel negative electrode grids with a metal base selected from the group consisting of tantalum, titanium-tantalum alloys and or alloy of tungsten-rhenium provided with a thin coating of a metal selected from the group consisting of cadmium, lead and silver.

It is another object of the invention to provide improved lead-acid storage batteries in which the battery grids avoid the disadvantages of the prior art.

These and other objects and advantages of the invention will become obvious from the following detailed description.

THE INVENTION

The novel battery of the invention is comprised of a battery housing provided with a cover, positive and negative electrodes and an electrolyte in the housing, the positive electrode grids being selected from the group of metals consisting of tungsten-rhenium alloys, tantalum and titanium-tantalum alloys and the negative electrode grids being selected from the group consisting of tantalum, titanium-tantalum alloys and an alloy of tungsten-rhenium provided with a thin coating of cadmium, silver or lead.

The novel electrode bases of the invention avoid the deficiencies of great weight and fragility of the lead and lead-alloy bases and their low faraday efficiency which is primarily due to low oxygen over potential. The novel electrode bases are lighter, substantially corrosion resistant, more electrically conductive and are more malleable resulting in greater ease of producing the final form of the electrodes.

The electrode bases may be used for both the positive and the negative electrodes as they possess a high hydrogen overpotential at the negative pole and a high oxygen overpotential at the positive pole and show a low ohmic drop at the interface between the metal base and the active pastes. Moreover, the electrodes bases are completely electrochemically and chemically stable in the concentrated sulfuric acid environment of the battery.

The desire for the high oxygen overpotential is to avoid the undesired production of oxygen by the following reaction

which reduces the faraday efficiency.

The tantalum base is the commercially pure (c.p.) tantalum and the titanium-tantalum alloy contains 99.9 to 93% by weight of titanium and 0.1 to 7% by weight of tantalum, preferably about 95% titanium — 5% tantalum. The tungsten-rhenium alloy contains 99.9 to 97.5% by weight of tungsten and 0.1 to 2.5% by weight of rhenium, but preferably 1.0 to 2.0% by weight of rhenium.

The metals to be used as the positive electrode base are corrosion resistant and satisfy the various requirements to be useful in a lead-acid battery. When used as a base for a negative electrode, tungsten-rhenium alloys should be provided with a thin layer of cadmium, silver or lead to have a high hydrogen overpotential. The said layer may be 0.1 to 20 microns thick. Moreover, the layer increases the adherence of the negative electrode paste to the base.

The thin layer of cadmium, silver or lead over the negative electrode metal grid can be applied by known methods such as galvanic deposition or thermal deposition by decomposition of salts of the metals.

The active materials for the positive and negative electrodes are applied to the electrode bases of the invention by the well known methods used to produce the pasted plates (or Faure's plates) for lead-acid batteries. In Chapter 2 of the book entitled "Storage Batteries" by George Wood Vinal, edited by John Wiley & Sons Inc., the commercially used methods to apply the active materials on the electrode grids are reviewed.

The positive electrode active material paste is generally composed of a blend of lead oxides and sulfuric acid. A commonly used basic formulation comprises 60 to 85% uncalcined oxides consisting of finely divided lead particles partially oxidized and up to 20% red lead $Pb_3O_4$ mixed with dilute $H_2SO_4$. The paste is applied over the electrode base or grid in thicknesses of a few millimeters, and it adheres strongly to the grid upon hardening.

The negative electrode active material paste is generally composed of 99% finely divided lead or partially oxidized lead mixed with an organic binder and may also include expanders such as lampblack. After drying and hardening, the formed electrodes are usually activated by polarizing the positive electrodes as cathodes in dilute sulfuric acid. Alternatively, the formed electrodes are assembled in the battery, and the battery is repeatedly charged and discharged several times in order to pre-condition the electrodes.

The electrodes are positioned in a battery casing constructed from hard rubber, plastic, or glass. The positioning of the pasted electrodes is such that the positive and negative electrodes alternate, but do not contact. Spacers or separators are generally added to aid in preventing the contact of positive and negative electrodes. The negative grids, however, are electrically connected to one another and to a negative electrode terminal. The positive grids are also connected to each other and to a positive electrode terminal. A battery casing cover can also be provided with means for allowing the electrode terminals to protrude through the casing cover and thereby be exposed for electrical connection of the battery.

It is an advantage of the process that the electrode grids of the invention can be re-used as grids for fresh pasted coatings even after the original pasted active material has detached completely.

In the following examples there are described several preferred embodiments to illustrate the invention. However, it is to be understood that the invention is not intended to be limited to the specific embodiments.

EXAMPLE 1

A test battery cell was prepared with standard pasted positive electrodes and negative electrodes utilizing grids of the materials shown in Table I. Table I illustrates the determined hydrogen overpotentials of the electrodes and their corrosion performance after several charge and discharge cycles carried out at room temperature.

TABLE I

| Electrode Base | Corrosion | Hydrogen Overpotential |
|---|---|---|
| Pb-Sb | slightly anodic | high |
| c.p. Al | fluctuating anodic | low |
| AlSi(Mg) | " " | moderate |
| AlSiMg | " " | moderate |
| TiPd | None | low |
| c.p.Ti | severe | high |
| TiY | slight | " |
| TiTa | None | " |
| Ta | None | " |
| W | None | low |
| W-Re | None | low |
| W-Re-lead coating | None | high |

Also, the workability, specific weight, electrical conductivity, cost and ohmic drop at the interface of the ative paste and metal base were considered and it was determined that only tantalum, titanium-tantalum alloys and tungsten-rhenium alloys were useful as positive electrode base materials. Tantalum has the particular advantage of being both electrochemically and chemically stable, a high hydrogen overpotential and good workability and the titanium-tantalum alloys have the same advantages as well as the additional advantage of the lower specific weight. The tungsten-rhenium alloy is electrochemically and chemically stable, has high workability and a high hydrogen overpotential, especially if provided with a thin layer of metallic lead such as $<0.5\mu$ thick.

Various modifications of the electrodes and batteries of the invention may be made without departing from the spirit or scope thereof and it is to be understood that the invention is to be limited only as defined in the appended claims.

We claim:

1. A battery comprising a battery housing provided with a cover, positive electrodes with metal bases pasted with particulate oxidized lead and/or lead oxides, negative electrodes with metal bases pasted with lead and/or oxidized lead and an electrolyte, the positive electrode metal bases being selected from the group consisting of tungsten-rhenium alloys, tantalum and titanium-tantalum alloys and the negative electrode metal base being selected from the group consisting of tantalum, titanium-tantalum alloys and tungsten-rhenium alloys coated with a metal selected from the group consisting of lead, cadmium and silver.

2. The battery of claim 1 wherein the titanium-tantalum alloys contain 0.1 to 7% by weight of tantalum.

3. The battery of claim 1 wherein the tungsten-rhenium alloys contain 0.1 to 2.5% by weight of rhenium.

4. The battery of claim 1 wherein the coating on the tungsten-rhenium alloy is 0.1 to 20 microns thick.

5. A lead-acid storage battery comprising a battery housing providing with a cover, positive electrodes with metal bases pasted with particulate oxidized lead and/or lead oxides, negative electrodes with metal bases pasted with lead and/or oxidized lead and a sulfuric acid electrolyte, the positive electrode metal bases selected from the group consisting of tantalum, an alloy of titanium containing 0.1 to 7% by weight of tantalum and an alloy of tungsten containing 0.1 to 2.5% by weight of rhenium and the negative electrode metal bases being selected from the group consisting of tantalum, an alloy of titanium containing 0.1 to 7% by weight of tantalum and an alloy of tungsten containing 0.1 to 2.5% by weight of rhenium coated with a metal selected from the group consisting of silver, lead and cadmium.

6. A positive electrode for a lead-acid battery comprising an electrode grid selected from the group consisting of tungsten-rhenium alloys, tantalum and titanium-tantalum alloys supporting a paste containing particulate oxidized lead and/or lead oxides.

7. The electrode of claim 6 wherein the tungsten-rhenium alloy contains 0.1 to 2.5% by weight of rhenium and the titanium-tantalum alloy contains 0.1 to 7% by weight of tantalum.

8. A negative electrode for a lead-acid battery consisting essentially of an electrode grid selected from the group consisting of tantalum, titanium-tantalum alloys and tungsten-rhenium alloys provided with an exterior thin coating of a metal selected from the group consisting of silver, cadmium and lead supporting a paste of lead and/or oxidized lead.

9. The electrode base of claim 8 wherein the tungsten-rhenium alloy contains 0.1 to 2.5% by weight of rhenium and the titanium-tantalum alloy contains 0.1 to 7% by weight of tantalum.

10. The electrode base of claim 8 wherein the coating on the tungsten-rhenium alloy is 0.1 to 20 microns thick.

* * * * *